April 4, 1950 — L. K. SPITZER — 2,502,898
POWER TRANSMISSION
Filed Aug. 8, 1944 — 5 Sheets-Sheet 2

INVENTOR.
LAWRENCE K. SPITZER
BY Homer H. Sweet
ATTORNEY.

April 4, 1950 L. K. SPITZER 2,502,898
POWER TRANSMISSION

Filed Aug. 8, 1944 5 Sheets-Sheet 5

INVENTOR.
LAWRENCE K. SPITZER
BY
ATTORNEY.

Patented Apr. 4, 1950

2,502,898

UNITED STATES PATENT OFFICE 2,502,898

POWER TRANSMISSION

Lawrence K. Spitzer, near Englewood, Colo., assignor to Equipment Repair & Manufacturing Company, Denver, Colo., a firm composed of Lawrence K. Spitzer, John C. Moore, and Wallace M. Ross Application August 8, 1944, Serial No. 548,565

3 Claims. (Cl. 254—187)

This invention relates to power transmissions adapted to connect between a source of power and elements and means associated for actuation and operation therewith, and more particularly to power transmission unit assemblies susceptible of convenient mounting on and operative association with the prime movers of tractors and analogous self-powered machines, and has as an object to provide an improved construction and unitary assembly of elements constituting such a transmission.

A further object of the invention is to provide an improved power transmission unit of multi-drum type particularly adapted for convenient and efficient selective application of power to and for work effect through ropes, cables, and the like.

A further object of the invention is to provide an improved power transmission unit of multi-drum type arranged for uniformly-effective association with power drives irrespective of their operative directions.

A further object of the invention is to provide an improved power transmission unit of multi-drum type susceptible of convenient alteration to selectively vary the speed and direction of drum element drive relative to the power input drive.

A further object of the invention is to provide an improved power transmission unit of multi-drum type susceptible of conveniently-selective, alternative connection with a power input drive for variation in drum element relative driven speed and direction.

A further object of the invention is to provide improved means in a power transmission unit of multi-drum type for selective control of the operative relation between the unit drum elements and a power input drive.

A further object of the invention is to provide improved means in a multi-drum type transmission unit selectively actuatable to vary and control the operative relation between the unit drum element and a power input drive.

A further object of the invention is to provide improved means in a multi-drum type transmission unit automatically operable to hold the unit drum elements against rotation and selectively actuatable to alternatively release the said drum elements for free rotation or connect said drum elements for power rotation with a power input drive.

A further object of the invention is to provide improved means in a multi-drum type transmission unit hydraulically actuatable for selective, independent control of unit drum element rotation.

A further object of the invention is to provide an improved multi-drum power transmission unit that is complete, compact, rugged, efficient in operation, quickly and conveniently adaptable for use with various specific types and constructions of prime movers in an infinite variety of specific installations, susceptible of prompt, positive and simple operative control with a minimum of operator fatigue, and capable of long-continued, heavy-duty use for a minimum of maintenance and operating expense.

With the foregoing and other objects in view, my invention consists in the construction, arrangement, and combination of elements hereinafter set forth, pointed out in my claims, and illustrated by the accompanying drawings, in which—

In the embodiment of the improvement as shown, a rigid, skeleton frame is provided in supporting and housing relation with the cooperating movable elements of the assembly, which frame may, of course, be of any suitable specific design and construction suited to its purpose and is typically illustrated as consisting of a recessed, elongate housing 20, an upper support assembly 21 secured at one margin to and extending laterally and substantially perpendicularly from an upper portion of said housing, a lower support assembly 22 secured at one margin to and extending laterally in spaced relation with the upper support assembly from a lower portion of said housing, spaced, parallel struts 23 connecting between the margins of the upper and lower support assemblies remote from the housing and in parallel relation with the housing base plate, and a brace member 24 connecting, preferably diagonally, between others of the frame elements as may be expedient or desirable to strengthen and lend rigidity to the frame. The various units and elements constituting the frame are rigidly interconnected in any suitable manner and are preferably, though not necessarily, separably associated to facilitate adjustment, adaptation, maintenance, and replacement of elements of the transmission unit, it being particularly desirable that the struts 23 be arranged for convenient removal and replacement relative to the associated frame members, for purposes which will hereinafter appear.

Symmetrically arranged with respect to the perpendicularly-related axes of the housing 20, integral, cylindrical sleeves 25 project from the base plate of said housing towards the struts 23 in axial alignment, perpendicular to the plane of the housing base plate, with similar sleeves 26 formed on and opening through the corresponding struts 23. The sleeves 25 and 26 house and operatively mount anti-friction bearing assemblies 27 through and between each aligned pair of which extends a shaft 28 thereby mounted for rotation about its axis in axially-perpendicular relation with the housing base plate and in bridging relation between said housing and one of the struts 23, the paired shafts 28 of the illustrated embodiment being thus disposed in spaced, parallel relation. The shafts 28 extend at one end each within the housing 20 to each support, in fixed relation therewith, a gear 29 thereby disposed for independent rotation with its associated shaft 28 within the said housing. The outer face of the housing 20 is closed by a removably-associated cover plate 30 provided with an outwardly-recessed gear case 31 overlying the central, vertical portion of the housing 20, and said gear case and housing is each provided on its vertical, median line with a spaced pair of journal bearings in such respective axial alignment as will serve to rotatably mount like upper and lower power input shafts, 32 and 33, respectively, in spaced, parallel relation with the shafts 28 and with each other and for engagement with the housing base plate between the adjacent peripheries of the gears 29. Where it traverses the housing 20, the shaft 32 carries a fixedly-associated pinion 34 in simultaneously-meshing relation with both of the gears 29, so that rotation of said shaft 32 acts through the pinion 34 to simultaneously rotate both of said gears 29, and consequently their associated shafts, 28, at the same speed and in the same direction, and where said shaft 32 traverses the gear case 31 it carries a fixedly-associated gear 35 in meshing relation with a coplanar gear 36 of different size fixed to the portion of the shaft 33 traversing said gear case, so that rotation of said shaft 33 acts through the gears 36 and 35, and pinion 34, to simultaneously rotate the gears 29 at the same speed and in the same direction, but at a rate of speed, and possibly in a direction, different from that obtaining when power is applied directly to and for rotation of the shaft 32. The shafts 32 and 33 constitute alternate means for power input to the transmission unit, and are adapted for selectively-alternate, but not simultaneous, connection with the driven shaft of a prime mover, or analogous source of power, for which purpose ends of the said shafts 32 and 33 extend in like manner axially and outwardly beyond the gear case 31 and are suitably worked and conditioned, through the provision of splines, key-seats, angular cross sections, or the like, for convenient operative connection with the driven member constituting the power source. As will be apparent, the construction illustrated and described permits of wide variation in the driven speed of the shafts 28 relative to the speed of the power source, since the relative sizes of the gears 35 and 36 can be varied at will, through simple substitution of alternate gear sets, for corresponding variation in the speed ratio between the pinion 34 and the power input applied through the shaft 33. Alternation of operative connection between the power source and the shafts 32 and 33 may be accomplished by altitudinal shifting of the power transmission, when feasible, by altitudinal shifting of the power source, when practicable, or by interchange in position of the said shafts relative to their mountings, equal spacing of the journal bearings for the said shafts above and below the line connecting the centers of the gears 29 permitting such interchange without change in established operative relationships.

Each of the shafts 28 mounts, supports, and is operatively associated with an identical assembly of cooperating elements arranged to selectively control and transmit for work effect power delivered through said shafts, hence but one of said assemblies will be described in detail. A drum unit 37 of suitable type, illustrated as comprising a cylindrical hub 38 from the ends of which substantially-radial, circular flanges 39 integrally extend in slightly-diverging relation, is formed with an axial bore adapted to accommodate wear bushings 40 sized to fit closely about the shaft 28 and mount the drum for free rotation thereon. The axial length of the drum 37 is somewhat less than the spacing between the bearings 27 supporting the shaft 28, and the flange 39 of said drum adjacent the strut sleeve 26 carries a concentric, annular, integral rib 41 directed axially and outwardly from the peripheral zone of the said flange to overhang a portion of the shaft 28 between the drum 37 and adjacent strut sleeve. Inner and outer cylindrical faces of the rib 41 are smooth, concentric with the axis of the shaft 28, and parallel to said shaft axis and each other and constitute areas against which friction bands may grip to selectively control rotation of the drum on and about its shaft mounting. Fixed to and for rotation with the shaft 28 within the circular recess formed by the rib 41, a spider comprising a hub 42 and a plurality of integral, substantially-radial arms 43 is disposed to support an expansible and contractible friction band 44 within and closely adjacent the inner face of the rib 41. The friction band 44 may be of any specific construction suited to its function of expansively engaging and frictionally gripping against the inner face of the rib 41 to thereby transmit rotation of the shaft 28 through the spider to effect corresponding rotation of the drum 37, and includes, generally, a band or strip of spring metal having a length slightly less than the circumference of the inner rib face, a lagging or facing of friction material replaceably associated with the outer face of said band or strip, and means adjustably and slidably relating proximate points of the inner band or strip surface with ends of the spider arms 43 when the friction band is held to a substantially circular outline about said spider. One of the spider arms 43 is arrested somewhat short of the orbit of the band 44 to hingedly connect with and support within said band orbit a fitting 45 carrying an hydraulic cylinder and piston unit 46 operatively disposed with its axis as a chord of the band orbit, and one end of the said band 44 fixedly engages with said fitting or unit. Fixed adjacent the other end and extending inwardly from the inner surface of the band 44, a lug 47 is disposed in spaced opposition and perpendicular axial relation with the unit 46 and is adjustably connected to the outer end of the piston stem of said unit, so that as the piston is caused to move within its cylinder away from the fitting 45 the lug 47 is correspondingly moved away from said cylinder to separate the adjacent ends of the friction band 44 and thereby expand said band into circumferential gripping engagement against the inner face of the rib 41. The cylinder and piston unit 46 may, of course, be arranged and connected for selective pressure actuation of its piston in both directions of its travel within the cylinder, but it is deemed more expedient and practical to provide, in a manner hereinafter more specifically set forth, for pressure actuation of the unit piston in but that direction operable to expand the associated friction band and to operatively connect a retractile coil spring 48 between the lug 47 and fitting 45 for return of the friction band and its actuating elements to contracted, non-engaging relation of said band with the rib 41. The means slidably and adjustably connecting between ends of the spider arms 43 and adjacent points of the friction band 44 may vary throughout a wide range of specific constructions and are typically represented in the drawings as consisting of tangential lugs on the ends of said arms 43, studs 49 threadedly and outwardly engaging through said lugs radially of the spider orbit for impingement of their outer ends against the inner surface of the friction band, and paired guides 50 fixed in spaced, parallel relation to and circumferentially of the band inner surface to engage on opposite sides of the outer end of each stud 49.

As above implied, the friction band 44 is normally held by the spring 48 in its contracted position of minimum diameter as determined by the adjustments had through the studs 49 and out of frictional engagement with the rib 41, in which band position the lug 47 is in its position of minimum separation relative to the unit 46 and the piston of said unit is adjacent the end of its cylinder remote from the lug 47, the spider assembly, band 44, and band-actuating elements being free to rotate with their associated shaft 28 as the latter is operatively driven. Expansion of the band 44 against the tension of the spring 48 for frictional engagement against the rib 41 and consequent transmission of power from the shaft 28 to effect rotation of the associated drum 37 is selectively had through the agency of manual controls and connections operable to introduce fluid under pressure between the piston and adjacent cylinder end of the unit 46, which controls and connections, while susceptible of wide variation in structure and specific form, are, for reasons of efficiency, convenience, and practicability, preferably constructed and arranged substantially as shown in the drawings and hereinafter described. The end of the shaft 28 supported by the strut 23 extends through the bearing 27 carried by the sleeve 26 and is formed with an end-opening, axial bore 51 extending inwardly of said shaft to communication with the inner end of a radial bore 52, preferably opening through a registering hole in the spider hub 42, and a pressure flow line 53 connects between the outer end of the bore 52 and the end of the cylinder of the unit 46 adjacent the fitting 45 to deliver fluid under pressure interiorly of said cylinder between the said cylinder end and the opposed face of the piston therein. The outer end of the shaft bore 51 is enlarged to accommodate and telescopically receive one end of a pressure flow line 54 non-rotatably cooperating with the said shaft bore and operatively sealed thereinto by means of a spring-pressed packing gland 55, of conventional type, and said line 54 extends, through any appropriate length, to connection at its other end with a cylinder and piston assembly 56 whereof the piston stem, extending through the cylinder end opposite to that intersected by the line 54, connects with a hand lever 57 hinged at one end to a bracket fixedly related with the assembly 56 for manual oscillation operable to move the piston of said assembly axially and from one end to the other of its cylinder. The pressure-transmitting system comprising the assemblies 46 and 56, bores 51 and 52, and flow lines 53 and 54, is suitably charged and supplied with oil or other suitable liquid, as by means of a liquid reservoir 58 associated and communicating with the cylinder of the assembly 56, so that actuation of the lever 57 to move the piston of the assembly 56 towards the cylinder end intersected by the line 54 operates to transmit pressure through said bores and flow lines to effect corresponding piston travel in the assembly 46 and consequent expansion of the friction band 44 to power-transmitting engagement with the rib 41, the spring 48 functioning, as above described, to contract the band 44 and return the pistons of the assemblies 46 and 56, and the lever 57, to their initial positions and relationships when said handle 57 is released by the operator.

The outer surface of the rib 41 is operatively related with a friction band 59, functionally and structurally similar to the band 44, disposed and arranged to selectively engage said rib surface with rotation-retarding and holding effect on the associated drum 37. One end of the band 59 is hingedly carried by the upper end of a bracket 60 fixedly upstanding from one end of a base plate 61 rigidly secured to an element of the frame lower support assembly beneath the drum rib 41, and said band substantially encircles said rib to hinged connection at its other end with a lug 62 upstanding from a bracket assembly 63 disposed to slide along the base plate 61 toward and away from the fixed bracket 60 in retained and guided relation between parallel, hooked flanges 64 rising in opposition from the side margins of said base plate. Travel of the bracket assembly 63 along the base plate 61 towards the bracket 60 operates through the lug 62 and its connection with the end of the band 59 to contract said band about and into frictional gripping engagement against the outer surface of the rib 41 for rotation-retarding and immobilizing effect on said rib and its associated drum, and said bracket assembly 63 is normally urged towards and held in its band-contracting position by means of an expansive coil spring 65 operatively engaging between the side of the said bracket assembly remote from the bracket 60 and a lug 66 fixedly upstanding from the base plate 61 in spaced relation with said bracket assembly and on the side thereof remote from the bracket 60. Expansion of the band 59 for rotational release of the rib 41 and associated drum is accomplished by moving the bracket assembly 63 away from the bracket 60 and towards the lug 66 against the pressure of the spring 65, and means for such purpose is provided in the form of a pressure-extensible cylinder and piston assembly 67 whereof the cylinder is secured to the bracket 60 and the movable piston stem adjustably connected with the bracket assembly 63 in such an operative arrangement as will serve to expand the band 59 into clearing relation with its associated rib 41 when the unit 67 is extended and permit contraction of said band through the agency of the spring 65 into drum-immobilizing, gripping engagement about said rib as the unit 67 is retracted.

Full practical utilization of the improved power transmission requires controls selectively operable to alternatively immobilize and hold each drum, to release the drum from all restraint for free rotation on and about its shaft 28, and to couple the drum in power-driven relation with said shaft. The band 44, with its controls, provides the means for selectively connecting the drum in power-driven relation with its shaft 28, and the band 59, with its controls, provides means for selectively immobilizing and releasing the drum when the unit 67 is suitably associated with a manually-actuatable pressure transmitting system, but since, with the arrangement shown and described, it is necessary that the band 59 be expanded under two conditions of drum control, one when the drum is to be released for free rotation relative to its shaft 28 and the other when the drum is to be connected in power-driven relation with said shaft, it is expedient to provide duplicate, separately-actuatable controls selectively operable to expand said band 59 and to correlate one of said controls with the means for expanding the band 44. The desired drum control may conveniently be had in a practical manner by connecting a branch pressure flow line 54' operatively between the flow line 54 and the cylinder and piston unit 67, so that actuation of the lever 57 serves to simultaneously extend the units 46 and 67 for corresponding simultaneous expansion of the bands 44 and 59 and consequent operative driven relation of the drum with its shaft while free from rotational restraint imposed by the band 59, and by providing a second cylinder and piston assembly 68, functionally and perhaps structurally identical with the unit 67, in parallel operative relation with said unit 67 between the bracket 60 and bracket assembly 63 and in selectively-extensible relation through a pressure flow line 69 with a cylinder and piston assembly 56' equipped with a hand lever 57' and reservoir 58' and essentially identical with the unit 56 and its associated elements. With such an arrangement, actuation of the handle 57' of the unit 56' operates through the line 69 to extend the unit 68 and expand the band 59, thus releasing the drum for free rotation, without in any way affecting the normal contracted disposition of the band 44.

The arrangement shown and described provides for full selective control of each drum 37 through the agency of two manually-actuatable elements, typified by the levers 57 and 57', for each drum, which elements are susceptible of convenient location at any desired point, close to or remote from the drums, through suitable fixed mounting of the units 56 and 56' and proper adjustment in the lengths of the pressure flow lines 54 and 69.

It is to be noted that, for the desired operative effect, the direction of friction band free end travel during band expansion and contraction should be correlated with the direction of drum rotation, and the construction and arrangement of the friction bands and their associated positioning and control elements is such as to facilitate such correlation with either direction of related drum rotation. The band 44, with its unit 46 and spring 48, is mounted on and completely carried by the spider 42—42, which spider may very easily be reversed in position on the shaft 28 when the corresponding strut 23 is dismounted from the frame, the flow line 53 requiring disconnection and subsequent reconnection during such reversal. Similarly, the bad 59, bracket 60, bracket assembly 63, lug 66, and units 67 and 68, are so carried by and related to the base plate 61 as to be movable with said plate as a unit, thereby providing for reversal of said unit in operative relation with the associated drum through removal of the adjacent strut 23, detachment of the plate 61 from its seat on the frame lower support assembly, and reattachment of said plate to its seat in reversed position, the flow lines 54, 54' and 69 being, of course, disconnected and subsequently reconnected during the change.

Figure 1:
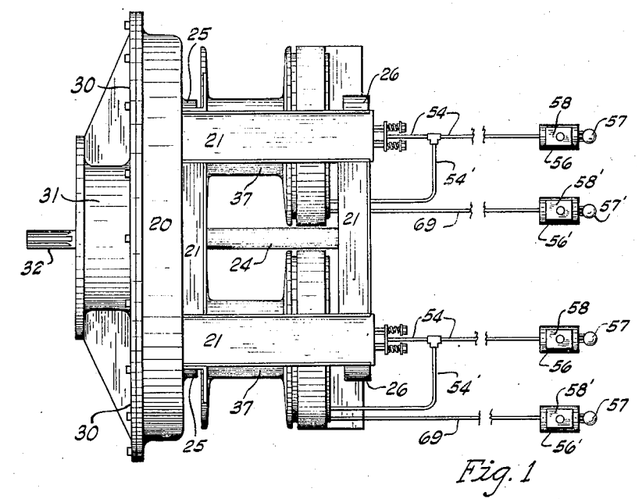
Figure 1 is a top plan view of a two-drum unit embodying the principles of the invention, as assembled and arranged ready for useful association with a prime mover.
Figure 2:
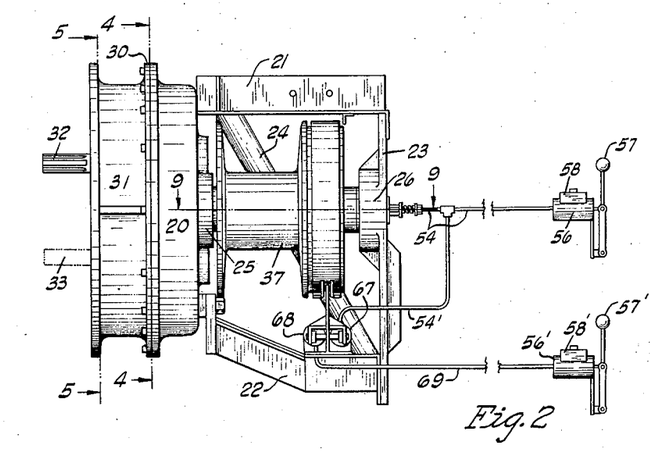
Figure 2 is an end elevation of the showing of Figure 1.
Figure 3:
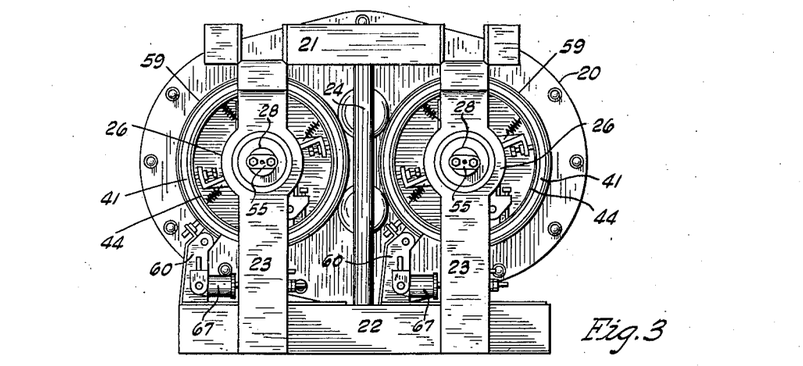
Figure 3 is a rear elevation of the showing of Figure 1.
Figure 4:
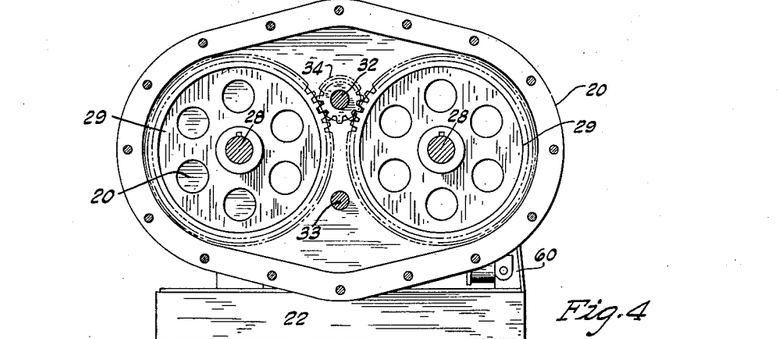
Figure 4 is a cross section taken on the indicated line 4—4 of Figure 2.
Figure 5:
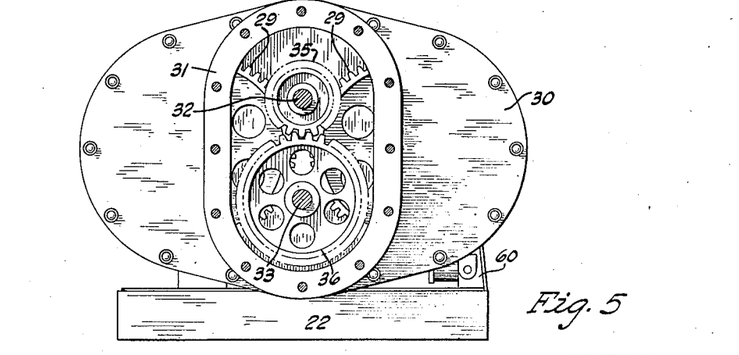
Figure 5 is a cross section taken on the indicated line 5—5 of Figure 2.
Figure 6:
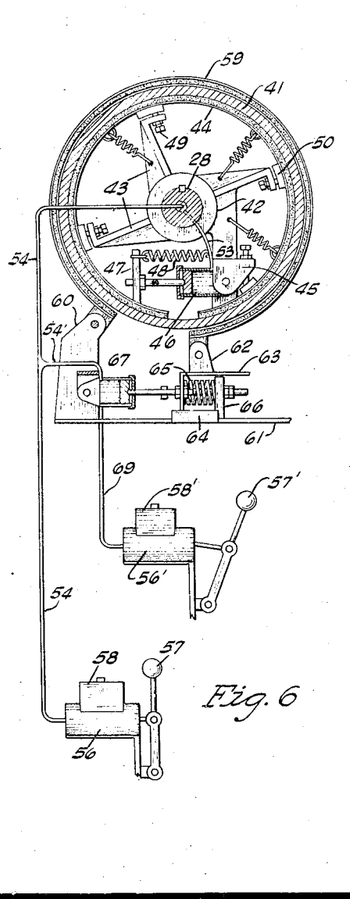
Figure 6 is a fragmentary, detail elevation, partly in section, illustrating the selectively-operable controls for one of the drum elements in one of their operative relationships with the drum.
Figure 7:
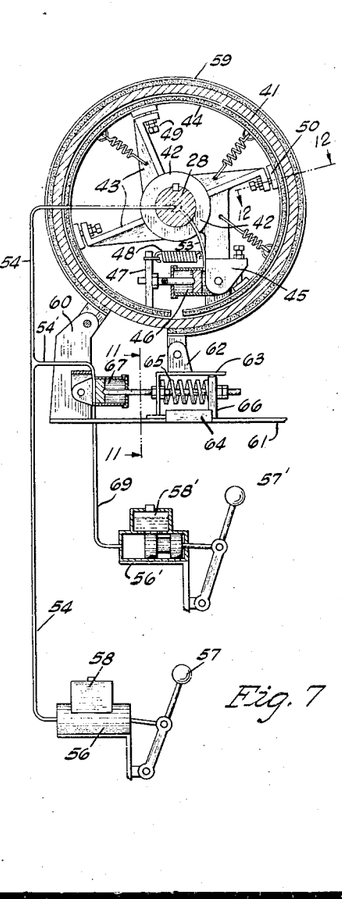
Figure 7 is a view similar to Figure 6 illustrating the controls in a different operative relationship with the drum.
Figure 8:
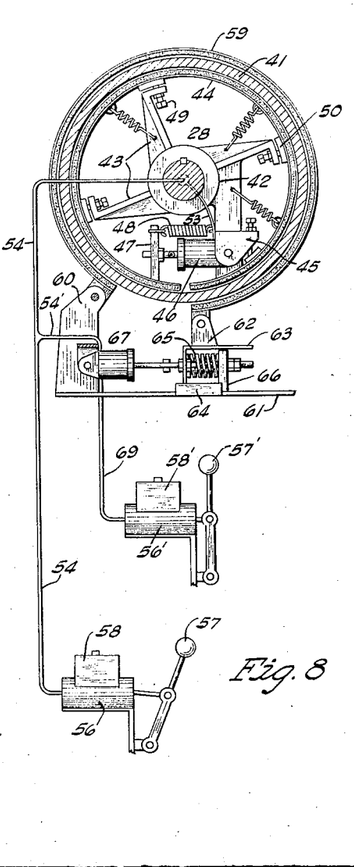
Figure 8 is another view similar to Figure 6 illustrating the controls in a yet different operative relationship with the drum.
Figures 9, 10, 11, 12:
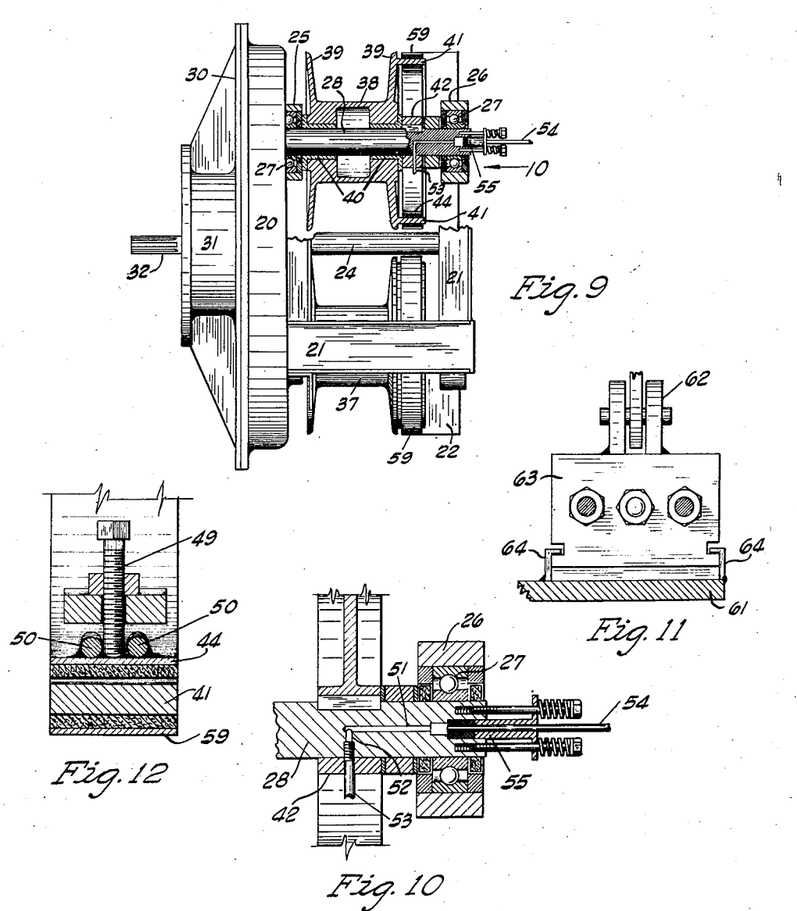
Figure 9 is a view similar to Figure 1 with the elements of one drum broken away and shown in section to better illustrate construction and otherwise concealed relationships.
Figure 10 is a fragmentary, detail section, on an enlarged scale, illustrating the structure indicated by the arrow 10 in Figure 9.
Figure 11 is a fragmentary, detail section, on an enlarged scale, taken on the indicated line 11—11 of Figure 7.
Figure 12 is a fragmentary, detail section, on an enlarged scale, taken on the indicated line 12—12 of Figure 7.
Figure 13:
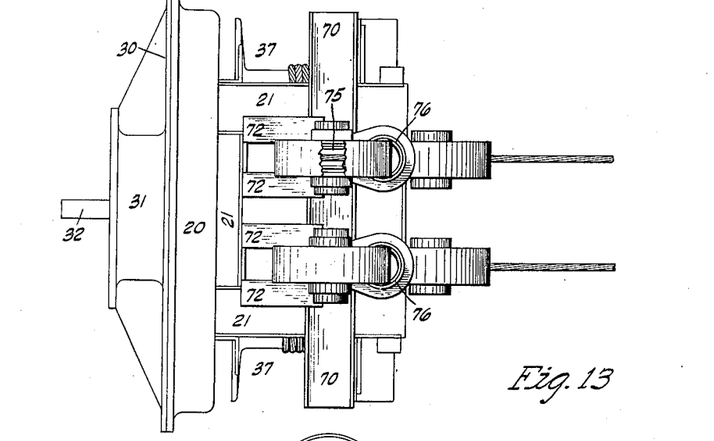
Figure 13 is a plan view of the unit shown in Figure 1 as equipped with a double cable fair-lead attachment.
Figure 14:
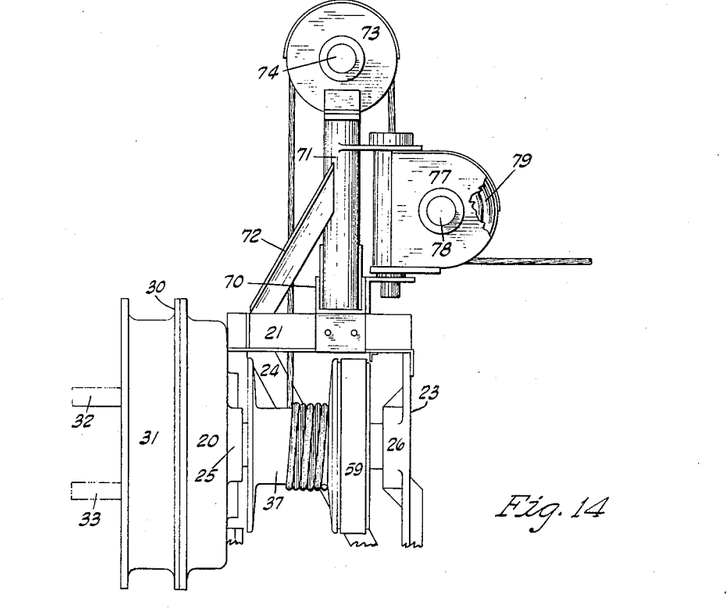
Figure 14 is an end elevation of the showing of Figure 13.

When, as is frequently the case, the drums 37 are connected to function as winches in operative association with ropes or cables variable in their angular approach to said drums, a fair-lead of the type illustrated in the drawings may be advantageously mounted on the transmission frame to cooperate with each of the drums. Each fair-lead is a unitary assembly arranged for mounting on and in removable, replaceable, and adjustable relation with the upper support assembly 21 of the transmission frame, whereto a mounting channel 70 is secured in spaced, parallel relation with the upper portion of the housing 20 above the annular ribs 41 of the drums 37. Elements of the fair-lead assembly are related to and supported by a post 71 connectible at its lower end between the upstanding legs of the channel 70 to rise vertically thereabove. A brace 72 is secured adjacent the upper end of the post 71 and extends angularly and downwardly therefrom to connection with an element of the upper support assembly adjacent the housing 20, and a pair of webs 73 rise in parallel, spaced relation from and above the post upper end to support an axle 74, perpendicular to the axis of the associated shaft 28 and in a plane parallel with that containing the axes of both shafts 28, whereon a grooved wheel 75 is mounted for free rotation in a vertical plane substantially tangent to one side or the other of the associated drum hub 38. Provision is made, as by means of attaching holes suitably intersecting legs of the channel 70 and the upper support element with which the brace 72 engages, for selectively mounting the post 71 and its brace 72 to position the associated wheel 75 in either of the vertical planes tangent to the corresponding drum hub and thereby adapt the fair-lead for operative association with its drum in either direction of drum rotation. Spaced outwardly from the side of the post 71 remote from the associated drum, a hollow spindle 76 rotatably engages in parallel relation with said post between brackets fixedly projecting from the latter to align the spindle axis substantially tangent to the overhanging groove periphery of the wheel 75, and a pair of webs 77 fixedly extend in spaced, parallel relation from the opposite vertical margins of a slot formed longitudinally in a wall of said spindle to support an axle 78 in perpendicular, spaced relation with the spindle axis. A grooved wheel 79 is mounted for free rotation on the axle 78 between the webs 77 and is preferably of such size as to bring its groove periphery into substantial tangency with the spindle axis, said wheel 79 being thereby mounted to rotate in a vertical plane between the webs 77 and to swing in a horizontal plane with said webs 77 about the axis of the spindle 76 while maintaining the inner margin of its grooved circumference in substantial alignment through said spindle 76 with and vertically beneath the overhanging grooved margin of the wheel 75. The rope or cable to be operated through the fair-lead assembly is secured at one end to and wound about the hub 38 of its drum 37, extended upwardly from said hub to and engaged about the upper half of the wheel 75, thence directed downwardly through the upper portion of the hollow spindle 76 to engagement with and about the lower, inner quadrant of the wheel 79, and brought outwardly between lower margins of the webs 77 to connection with the means, facilities, or agencies to be activated thereby. For protection and operative security, adjacent upper margins of the webs 73 and of the webs 77 are interconnected in covering relation with corresponding portions of the wheels rotatably associated therewith. As will be apparent, a fair-lead assembly may be mounted in operative association with either or both of the drums 37 and suitably related with the direction of drum rotation to guide the rope or cable into smooth winding and unwinding cooperation with the drum, or the fair-leads may be dismounted and removed from the transmission under conditions which obviate the advantages of their use.

While the improved power transmission illustrated and above described is particularly adapted for mounting on a tractor or like powered mobile unit, in driven relation with the prime mover of the said unit, it should be obvious that said transmission may be operatively combined with prime movers in many different installations, both fixed and mobile, to enhance and extend the utility, flexibility, and operative effectiveness of the source of power, the compact, unitary character of the transmission providing for convenience and security of installation in association with the prime mover and the nature and arrangement of the transmission controls facilitating its direction and manipulation from any convenient station with a minimum of operator fatigue.

While the drawings and foregoing description relate primarily to a two-drum power transmission unit, which is a form of the invention particularly well adapted to fulfill the needs of many specific situations, it is to be understood that the novel features and operative characteristics of the invention may be equally well embodied in a unit having but a single drum, or in units having in excess of two drums, with the exercise of but ordinary mechanical skill and without in any way departing from the essence and scope of the invention.

Since many changes, variations, and modifications in the specific form, construction, and arrangement of the elements shown and described may be had without departing from the spirit of the invention, I wish to be understood as being limited solely by the scope of the appended claims, rather than by any details of the illustrative showing and foregoing description.

I claim as my invention:

1. In apparatus of the character described having a power-rotatable shaft and a winding drum formed with an annular, concentric, axially-extending rib freely and independently rotatable on said shaft, clutch means selectively actuable to connect said drum in direct synchronously-driven relation with its associated shaft, said means comprising a spider reversibly fixed to the shaft within the rib orbit of the associated drum, a friction band fixed at one end to and movably embracing said spider in opposition to the inner cylindrical rib face, retractile spring means engaging between the free end of said band and said spider to yieldably hold said band in contracted relation about said spider and out of engagement with the adjacent rib face, and a pressure-responsive unit interconnecting between said spider and band free end inwardly adjacent and in bridging relation across the ends of said band extensible to directly expand said band against the tension of said spring means and into frictional engagement with the rib face.

2. In apparatus of the character described having a power-rotatable shaft and a winding drum formed with an annular, concentric, axially-extending rib freely and independently rotatable on said shaft, selectively-actuatable brake means operatively associated with said drum, said means comprising a plate reversibly fixed in spaced, tangential relation with the drum rib orbit, a bracket and a lug fixedly upstanding from and in spaced relation on said plate, a second bracket slidably associated with said plate adjacent said lug, spring means engaging between said lug and second bracket to yieldably urge the latter toward said first bracket, a friction band hinged at its opposite ends to said first and second brackets in embracing relation about the outer cylindrical face of the associated drum rib, and a selectively-actuatable, pressure-responsive unit between said first and second brackets extensible against the pressure of said spring means to separate said brackets for expansion of said band out of frictional engagement with said rib face.

3. In apparatus of the character described having a power-rotatable shaft and a winding drum formed with an annular, concentric, axially-extending rib freely and independently rotatable on said shaft, selectively-actuatable brake means operatively associated with said drum, said means comprising a plate reversibly fixed in spaced, tangential relation with the drum rib orbit, a bracket and a lug fixedly upstanding from and in spaced relation on said plate, a second bracket slidably associated with said plate adjacent said lug, spring means engaging between said lug and second bracket to yieldably urge the latter toward said first bracket, a friction band hinged at its opposite ends to said first and second brackets in embracing relation about the outer cylindrical face of the associated drum rib, and a pair of like, separately-served, pressure-responsive units between said first and second brackets respectively and selectively extensible against the pressure of said spring means to separate said brackets for expansion of said band out of frictional engagement with the rib face.

LAWRENCE K. SPITZER.

REFERENCES CITED

The following references are of record in the file of this patent:

UNITED STATES PATENTS

| Number | Name | Date |
|---|---|---|
| 765,785 | Nelson | July 26, 1904 |
| 898,682 | Riffle | Sept. 15, 1908 |
| 1,298,956 | Johnson | Apr. 1, 1919 |
| 1,878,282 | MaCaulay | Sept. 20, 1932 |
| 2,159,137 | Doty | May 23, 1939 |
| 2,178,280 | Hutchins et al. | Oct. 31, 1939 |
| 2,189,373 | Steel | Feb. 6, 1940 |
| 2,256,982 | Lawler | Sept. 23, 1941 |
| 2,272,917 | Lawler | Feb. 10, 1942 |
| 2,279,597 | Selmer | Apr. 14, 1942 |
| 2,312,552 | Hutchins | Mar. 2, 1943 |
| 2,317,171 | Berby | Apr. 20, 1943 |
| 2,321,905 | French | June 15, 1943 |
| 2,366,433 | Birdwell et al. | Jan. 2, 1945 |